US005596649A

United States Patent [19]

Liu

[11] Patent Number: 5,596,649

[45] Date of Patent: Jan. 21, 1997

[54] SOUND CONCENTRATOR FOR SELECTIVELY COLLECTING SOUND AND CONCENTRATING AND TRANSMITTING THE COLLECTED SOUND

[76] Inventor: Hong-Chuang Liu, No. 15, Alley 291, Sec. 1, Chien-Kuo S. Rd., Taipei, Taiwan

[21] Appl. No.: 346,276

[22] Filed: Nov. 22, 1994

[51] Int. Cl.$^6$ .......... H04B 3/00

[52] U.S. Cl. .......... 381/79; 381/77

[58] Field of Search .......... 381/77, 25, 79, 381/82; 455/66, 42

[56] References Cited

U.S. PATENT DOCUMENTS

| | | | |
|---|---|---|---|
| 4,685,133 | 8/1987 | Iggulden | 381/77 |
| 5,012,350 | 4/1991 | Streck | 455/66 |
| 5,179,576 | 1/1993 | Hopkins | 455/42 |

OTHER PUBLICATIONS

"IEEE Standard Dictionary of Electrical and Electronics Terms"; 1984; p. 617.

*Primary Examiner*—William Cumming
*Assistant Examiner*—Minsun Oh
*Attorney, Agent, or Firm*—Varndell Legal Group

[57] ABSTRACT

An improved sound concentrates for selectively collecting sound and concentrating and transmitting the collected sound that include an emission circuit and a receiving circuit, each of these two circuits containing an antenna used as a signal transmission to communicate with each other. In the emission circuit, a selection switch is arranged, which enables users to choose one sound source among a variety of applications that the sound concentrator of the invention provides, such as telephones, microphones, television sets, and audio equipment, and so on. The receiving circuit receives signals from the emission circuit and contains an automatic volume control and a treble/bass boosting circuit to provide users a proper sound volume and quality and has an excellent collection effect for distant sounds.

3 Claims, 4 Drawing Sheets

SOUND CONCENTRATOR FOR SELECTIVELY COLLECTING SOUND AND CONCENTRATING AND TRANSMITTING THE COLLECTED SOUND

FIELD OF THE INVENTION

This invention relates to an improved sound concentrators for selectively collecting sound and concentrating and transmitting the collected sound and, more particularly, to a concentrator structure that can be used on telephones, microphones, television sets, and audio equipment to collect sounds from such sources. In addition, the sound concentrator of this invention can properly regulate received sound levels to get rid of distance influences and obtain an optimum sound collection effect.

OBJECT OF THE INVENTION

The primary object of the invention is to provide an improved sound concentrator for selectively collecting sound and concentrating and transmitting the collected sound that can be used on telephones, television sets, audio equipment, and video tape recorders or players to collect sound signals from such sources for purposes of monitoring, recording, and so on and which can eliminate distance influences on its collection effect and which is featured by a frequency modulation signal receiving capability.

Another object of the invention is to provide an improved sound concentrator for selectively collecting sound and concentrating and transmitting the collected sound that has a receiving circuit containing a treble/bass boosting circuit capable of collecting and amplifying sound signals from a specific source, either of a high-pitched or of a low-pitched voice, to obtain an optimum collection effect.

Another object of the invention is to provide an improved sound concentrator for selectively collecting sound and concentrating and transmitting the collected sound that has a receiving circuit in which an automatic sound volume control circuit is arranged to protect users from detriment to their hearing when a strong sound signal is received.

SUMMARY OF THE INVENTION

To achieve foregoing objects, the sound concentrator for selectively collecting sound and concentrating and transmitting the collected sound according to the invention is constituted of an emission circuit and a receiving circuit; the emission circuit containing a telephone signal coupling circuit, a microphone amplification circuit, a signal matching network, a selection switch, a stereo transmitter circuit, and an emission antenna; and the receiving circuit containing a receiving antenna, a frequency modulation signal receiver circuit, a phase lock loop (PLL) stereo decoder, a microphone pre-amplification circuit, a selection switch, and an amplification circuit. The foregoing internal emission and receiving antennas are used as signal transmission media to deliver signals from the emission circuit to the receiving circuit. In the emission circuit, a selection switch is connected at its one end to a telephone signal coupling circuit, a microphone pre-amplification circuit, and a signal matching network to enable users to choose a proper source; however, at the other end, the selection switch is serially connected to a stereo transmitter circuit and an emission antenna to transmit signals. In the receiving circuitry portion, a receiving antenna is arranged to pick up stereo frequency modulation signals coming from the emission circuit or a frequency modulation broadcast stations. A microphone pre-amplification circuit is connected to one end of and parallel with the PLL stereo decoder on the same side of the selection switch; the other end of the selection switch is linked with an amplification circuit. And so users can operate the selection switch to connect the amplification circuit either to the PLL stereo decoder or to the microphone pre-amplification circuit. The receiving circuit also incorporates an automatic volume control circuit and a treble/bass boosting circuit to enhance its performance of collecting distant sounds and to properly adjust received sound volume, avoiding detriment to people's hearing due to overloud sounds.

The detailed structure, features, and other advantages of the present invention will become readily apparent from the following detailed description of a preferred embodiment when read with reference to the accompanying drawings.

DETAILED DESCRIPTION OF THE PREFERRED EMBODIMENT

Figure 1:
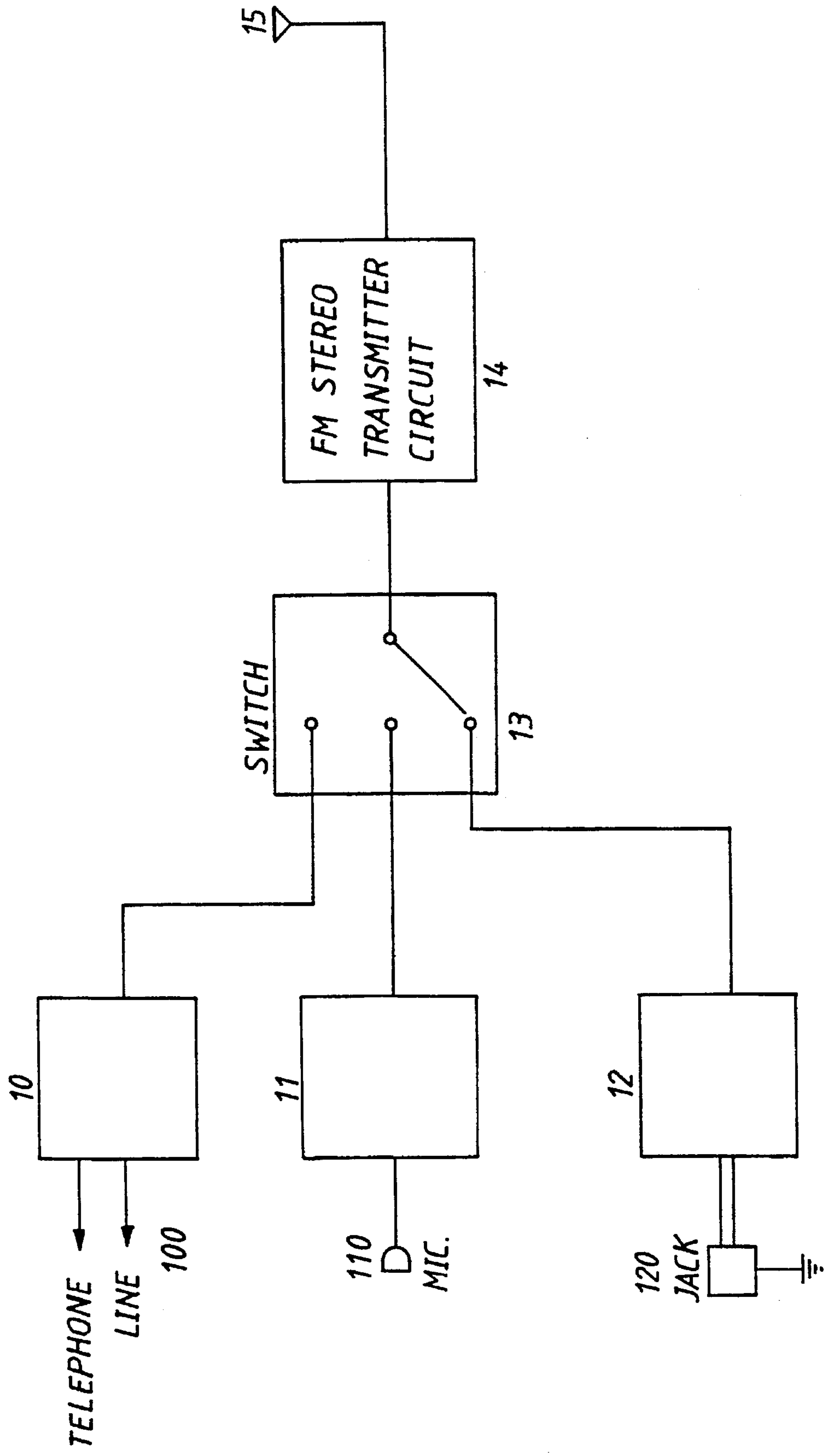
FIG. 1 is an electric schematic block diagram of the emission circuit of the invention.
Figure 3:
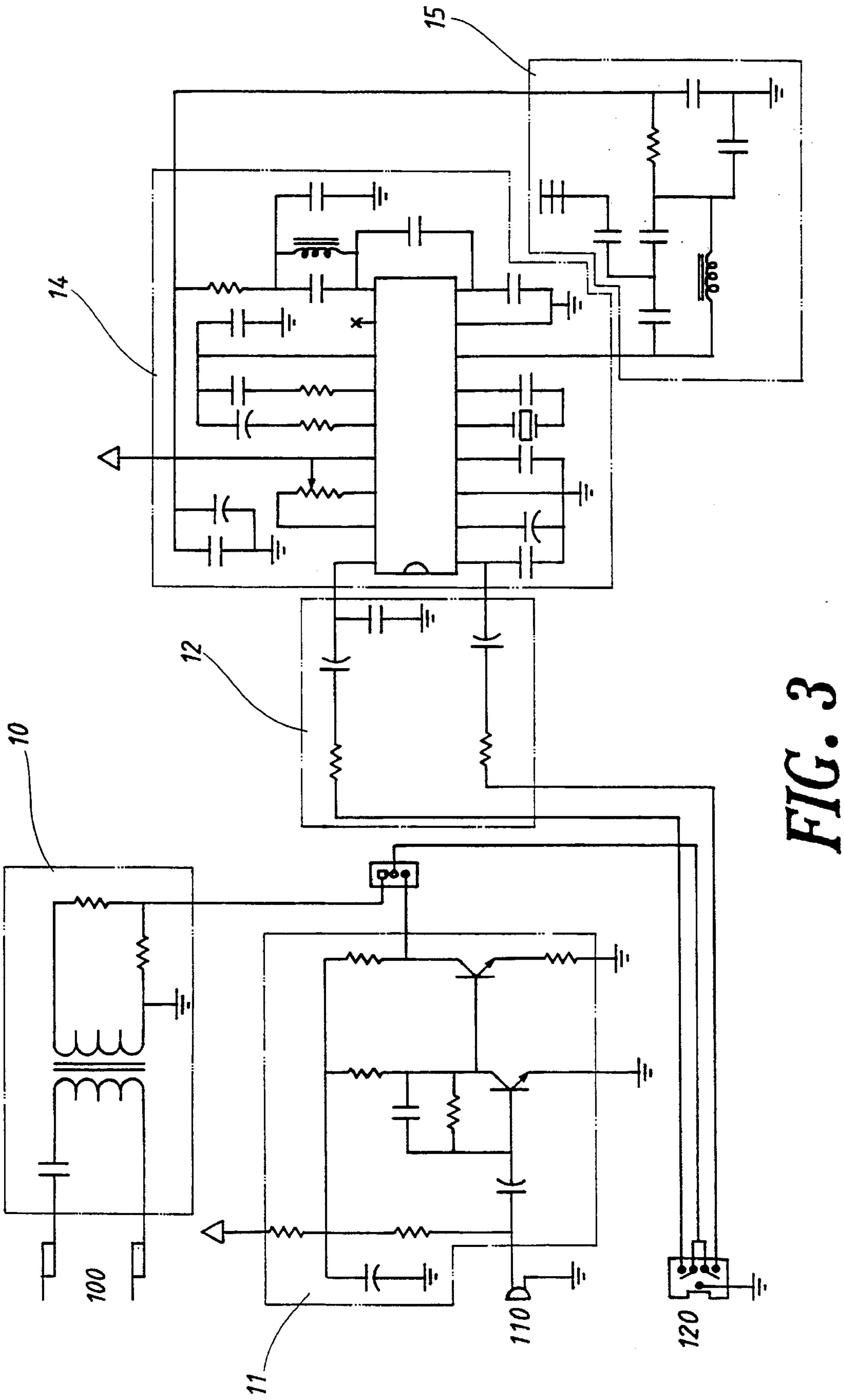
FIG. 3 is a circuit diagram of the emission circuit of the invention.

FIGS. 1 and 3 are respectively a schematic block diagram and a circuit diagram showing an embodiment of an emission circuit according to the present invention. As shown in these figures, the emission circuit is composed of a telephone signal coupling circuit (10), a microphone amplification circuit (11), telephone connection lines (100), a microphone (110), a signal matching network (12), a jack (120), a selection switch (13), a stereo transmitter circuit (14), and an emission antenna (15). The selection switch (13) is connected at its one end to the telephone signal coupling circuit (10), the microphone amplification circuit (11), and the signal matching network (12); the telephone signal coupling circuit (10) being able to be linked to a telephone set via telephone connection lines (100), the microphone amplification circuit (11) being connected to a microphone (110) to pick up external voices, and the signal matching network (12) being tied to the jack (120) to receive signals from television sets, audio equipment, or video tape recorders. Therefore, the user can manipulate the switch to select a sound source among the foregoing three circuits. A stereo transmitter circuit (14) and an emission antenna (15) are connected to the other end of the selection switch (13). The operations of the emission circuit for each of the three positions of the selection switch (13) are individually illustrated as follows.

1. The telephone signal coupling circuit (10) connected to a telephone set via telephone lines (100) eliminates direct voltages and matches voice signals with proper electric voltage levels and then, through the switchover of the selection switch (13), transmit these electric signals to the stereo transmitter circuit (14) where signals of the left and the right channels are mixed and converted to high frequency signals. These high frequency signals are sent out by way of the emission antenna (15).

2. The microphone (110) senses outside voices and a bioplar transistor in the microphone amplification circuit (11) amplify these signals coming from the microphone (110) and then, through the switchover of the selection switch (13), these signals are delivered to the stereo transmitter circuit (14) where signals of the left and the right channels are mixed and converted to high frequency signals. These high frequency signals are finally given off via the emission antenna (15).
3. A jack (120) receives signals from external electrical appliances such as television sets, audio equipment, or video tape recorders. Through transmission lines these signals are sent into the signal matching network (12) where signals are attenuated to proper levels and then, through the switchover of the selection switch (13), delivered to the stereo transmitter circuit (14) where signals of the left and the right channels are mixed and converted to high frequency signals which are finally sent out by the emission antenna (15).

Figure 2:
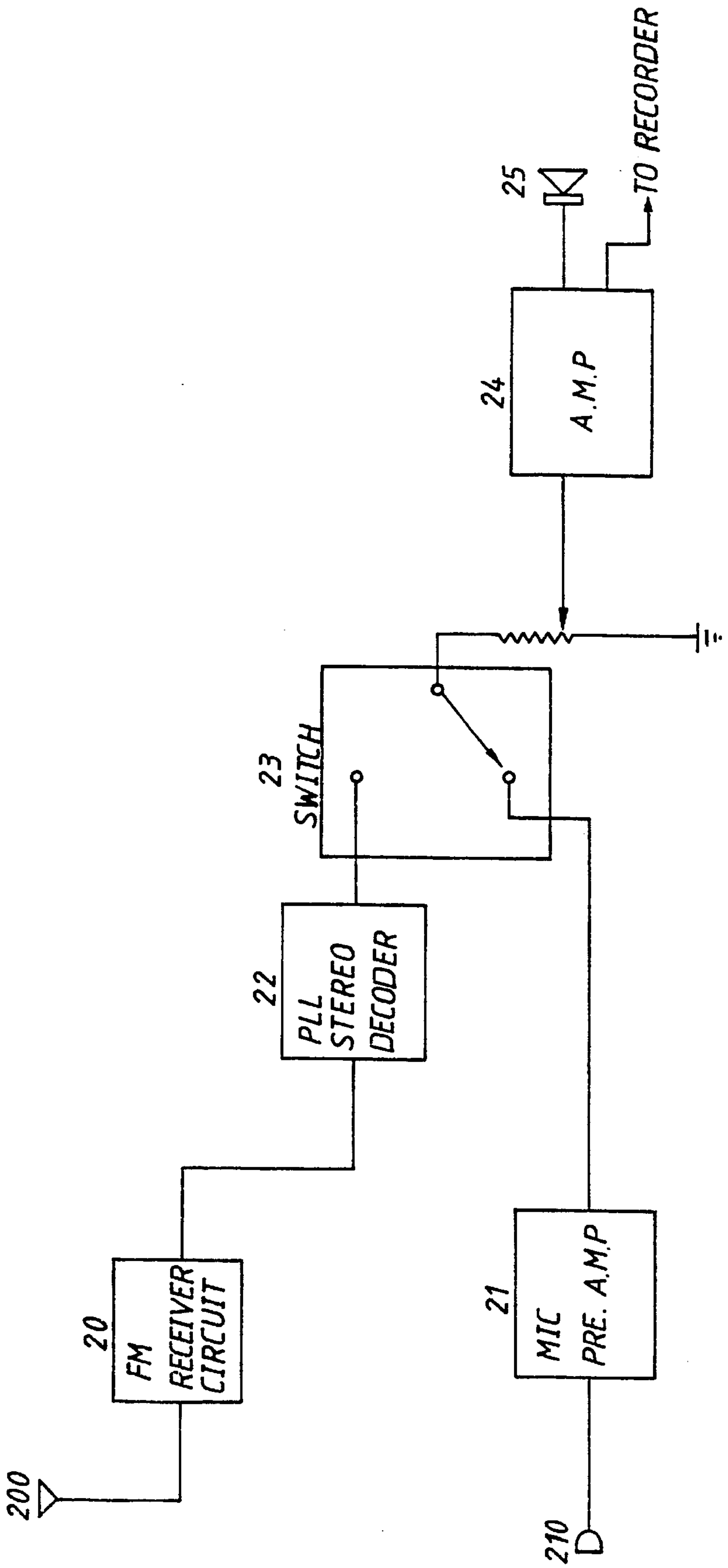
FIG. 2 is an electric schematic block diagram of the receiving circuit of the invention.
Figure 4:
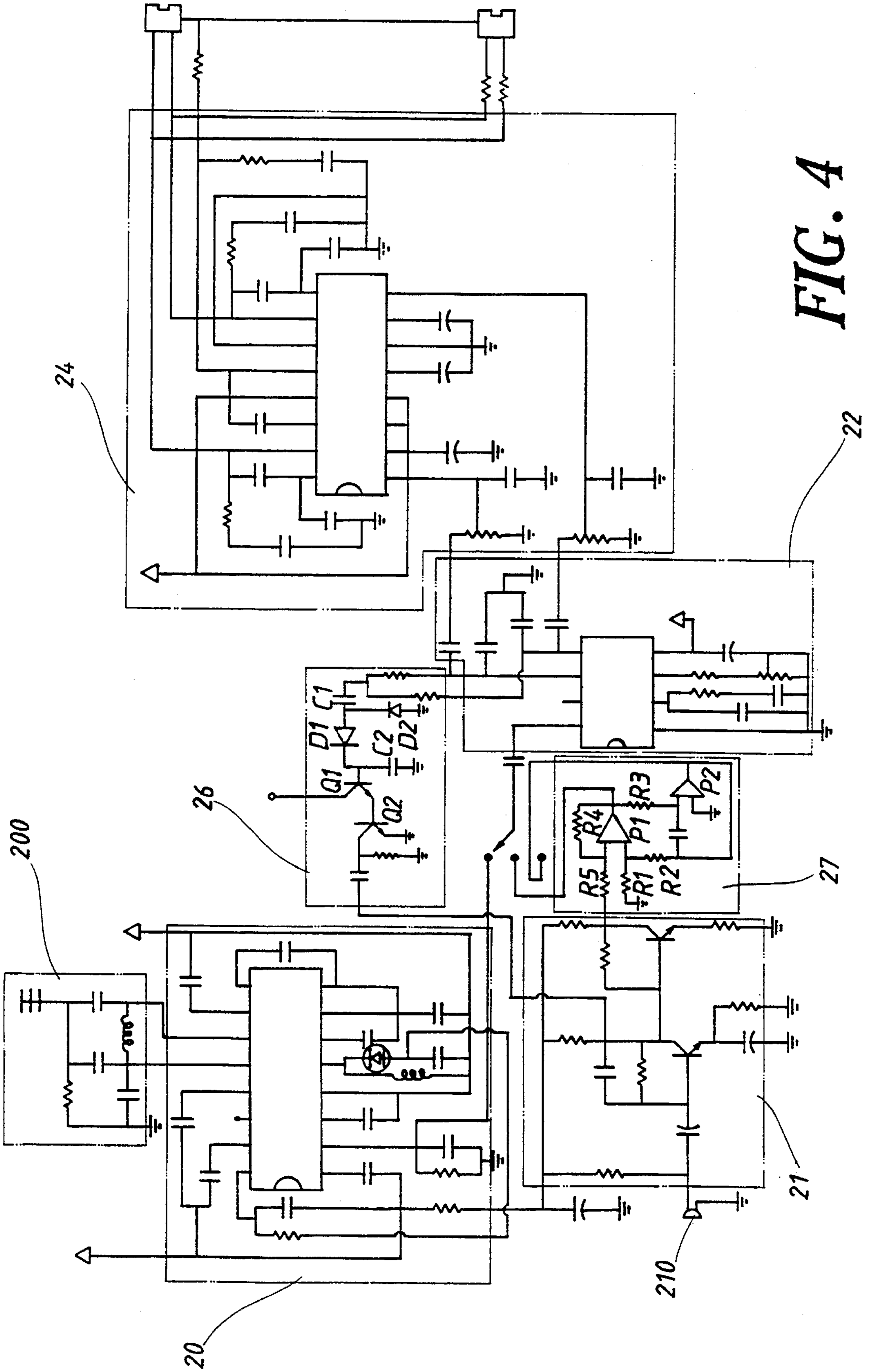
FIG. 4 is a circuit diagram of the receiving circuit of the invention.

FIGS. 2 and 4 show separately the block diagram and the circuit diagram of an embodiment of a receiving circuit according to the invention. As can be seen from these figures, the receiving circuit is constituted by a receiving antenna (200), a frequency modulation signal receiving circuit (20), a phase lock loop (PLL) stereo decoder (22), a microphone (210), a microphone pre-amplification circuit (21), a selection switch (23), an amplification circuit (24), and an output speaker (25) as well as a treble/bass boosting circuit (27) and an automatic volume control circuit (28) connected in parallel. By way of the receiving antenna (200) the receiving circuit gets signals coming from the emission circuit or a broadcast station and filters out the waves outside the frequency modulated broadcast band from these signals to enhance sensitivity. After performing a series of frequency mixing, intermediate frequency amplification, and wave detection, the frequency modulation signal receiving circuit (20) outputs sound signals that, by the PLL stereo decoder (22), are unscrambled to two channel stereo sound signals. Through the selection switch (23), these stereo sound signals are sent into the amplification circuit (24) where these signal are magnified and then sent out. Alternatively, through manipulating the selection switch (23), the sound concentrator of this present invention can also employ the microphone (210) to pick up sounds. In this case, for the purpose of automatic volume control, the stereo sound signals produced in the PLL stereo decoder (22) will firstly be sent into the automatic volume control circuit (26) where a capacitor (C1) filters out direct-current signals, then are rectified by diodes (D1) and (D2) and filtered by a capacitor (C2), and then are sent by the transistors (Q1) and (Q2) to the microphone pre-amplification circuit (21) to control the signal gain. The treble/bass boosting circuit (27) is composed of operational amplifiers (P1) and (P2), capacitors (C1) and (C2), and resistors (R1)–(R5) to form active high-pass and low-pass filters, which can boost the treble and bass tone for sound sources with varied frequencies. Therefore, users can more clearly distinguish specified sound sources.

From the above illustrated, it is evident that the combination of the emission circuit and the receiving circuit greatly heightens the performance of a sound concentrator and can eliminate the influence of distance difference; further, it incorporates the safety concern of human being bodies meanwhile has an excellent sound concentration effect. Thus, the present invention indeed has great practical value.

What is claimed is:

1. An improved structure of sound concentrators comprising an emission circuit that contains a telephone signal coupling circuit, a microphone amplification circuit, a signal matching network, a selection switch, a stereo transmitter circuit, and an emission antenna; and a receiving circuit that contains a receiving antenna, a frequency modulation signal receiving circuit, a phase lock loop (PLL) stereo decoder, a microphone pre-amplification circuit, a selection switch, and an amplification circuit;

and characterized in that said emission antenna and said receiving antenna are used to transmit signals between said emission circuit and said receiving circuit; and in that said telephone signal coupling circuit, said microphone amplification circuit, and said signal matching network are in parallel connected to one end of said selection switch of the emission circuit; said stereo transmitter circuit, and said emission antenna are serially connected to the other end;

and in that said selection switch of the receiving circuit, at its one end, is serially connected with the amplification circuit; at the other end, said selection switch is linked with the phase lock loop (PLL) stereo decoder and the microphone pre-amplification circuit; said PLL stereo decoder being serially affixed by the frequency modulation signal receiving circuit and the receiving antenna, and said microphone pre-amplification circuit being in series affixed by the microphone;

and in that an automatic volume control circuit and a treble/bass boosting circuit are arranged between said PLL stereo decoder of the receiving circuit and said microphone pre-amplification circuit.

2. In the improved device as claimed in claim 1, the emission circuit wherein said selection switch is employed to select which one of the structure's sound concentration functions to be used.

3. In the improved device claimed in claim 1, the receiving circuit wherein said receivng antenna can receive signals of a broadcast station.

* * * * *